US007825847B2

(12) United States Patent
Fujimura

(10) Patent No.: US 7,825,847 B2
(45) Date of Patent: Nov. 2, 2010

(54) SYNTHETIC APERTURE RADAR, COMPACT POLARIMETRIC SAR PROCESSING METHOD AND PROGRAM

(75) Inventor: Takashi Fujimura, Tokyo (JP)

(73) Assignee: NEC Corporation, Tokyo (JP)

( * ) Notice: Subject to any disclaimer, the term of this patent is extended or adjusted under 35 U.S.C. 154(b) by 112 days.

(21) Appl. No.: 12/234,391

(22) Filed: Sep. 19, 2008

(65) Prior Publication Data

US 2009/0102704 A1    Apr. 23, 2009

(30) Foreign Application Priority Data

Sep. 20, 2007    (JP) ............................. 2007-244034

(51) Int. Cl.
*G01S 13/00* (2006.01)
(52) U.S. Cl. ..................................... 342/25 R; 342/188
(58) Field of Classification Search ................ 342/25 R
See application file for complete search history.

(56) References Cited

U.S. PATENT DOCUMENTS

| 6,018,306 | A  | * | 1/2000  | Serbin ........................ 342/25 A |
| 6,967,612 | B1 | * | 11/2005 | Gorman et al. ............... 342/22 |
| 2009/0224964 | A1 | * | 9/2009 | Raney ........................ 342/25 F |

FOREIGN PATENT DOCUMENTS

| JP | 1991089606 A | 4/1991 |
| JP | 2001091643 A | * 4/2001 |
| JP | 2002064321 A | 2/2002 |
| JP | 2006322848 A | 11/2006 |

OTHER PUBLICATIONS

Jean-Claude Souyris et al., "Compact Polarimetry Based on Symmetry Properties of Geophysical Media: The π/4 Mode", IEEE Transaction on Geoscience and Remote Sensing, vol. 43, No. 3, Mar. 2005, pp. 634-646.
R. Keith Raney, "Hybrid-Polarity SAR Architecture", 2006 IEEE, pp. 3829-3831.

* cited by examiner

*Primary Examiner*—Thomas H Tarcza
*Assistant Examiner*—Timothy A Brainard

(57) ABSTRACT

To provide a synthetic aperture radar for achieving a compact polarimetric SAR easily by using a general-purpose phased array antenna for vertical and horizontal polarizations. An antenna section is a phased array antenna for vertical and horizontal polarizations capable of switching to the vertical or horizontal polarizations in transmission at every transmission/reception module, and receiving two of the horizontal and vertical polarizations simultaneously. The control system divides electrically the phased array antenna in the elevation direction in transmission to set one of them for horizontal polarization transmission and the other for vertical polarization transmission, and sets the antenna for dual polarization simultaneous reception to receive the horizontal and vertical polarizations. The SAR processor takes complex data of horizontal and vertical polarization receiving data as a target vector, and obtains a calculation result corresponding to a covariance matrix of a target vector in full polarimetry so as to perform polarimetric SAR processing.

14 Claims, 12 Drawing Sheets

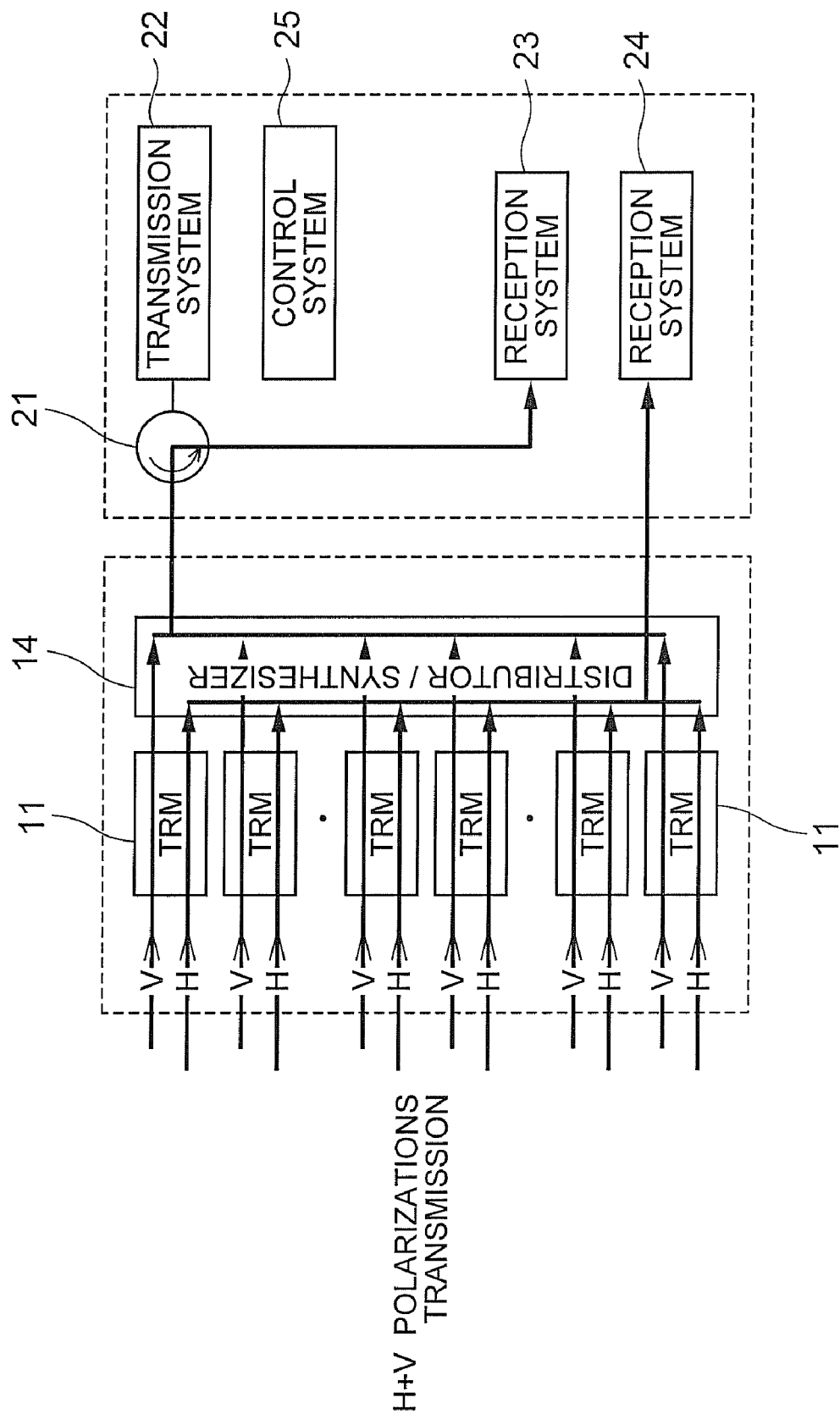

FIG. 7

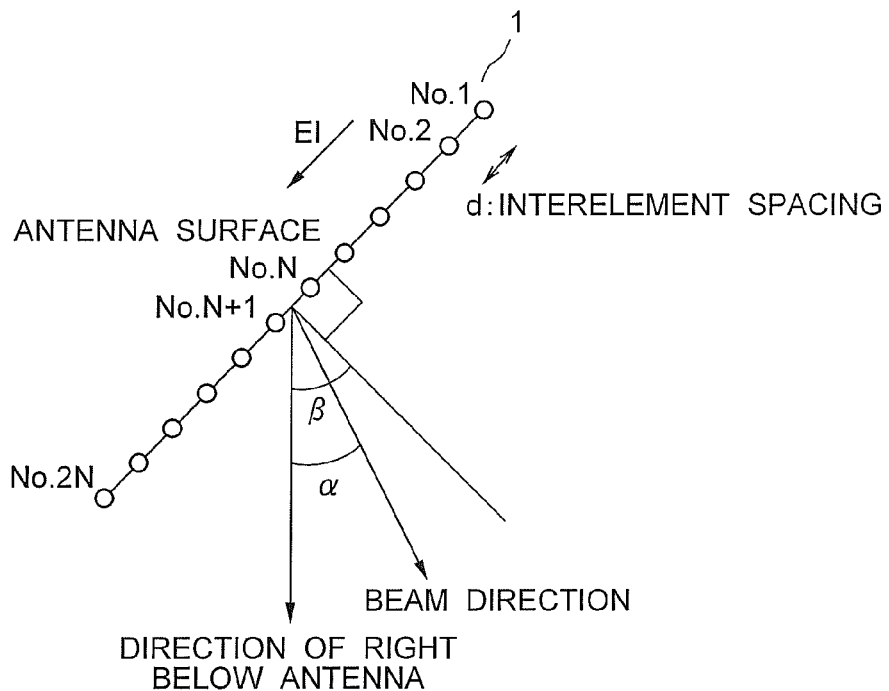

| 45 DEGREES LINEAR POLARIZATION TRANSMISSION | No | TRANSMISSION POLARIZATION | RECEPTION POLARIZATION | TRANSMISSION PHASE [rad] | RECEPTION PHASE [rad] |
|---|---|---|---|---|---|
| | 1~N | V | H+V | $\phi(i)$ | $\phi(i)$ |
| | N+1~2N | H | | | |

| LEFT CIRCULAR POLARIZATION TRANSMISSION | No | TRANSMISSION POLARIZATION | RECEPTION POLARIZATION | TRANSMISSION PHASE [rad] | RECEPTION PHASE [rad] |
|---|---|---|---|---|---|
| | 1~N | V | H+V | $\phi(i)$ | $\phi(i)$ |
| | N+1~2N | H | | $\phi(i)+\pi/2$ | |

| RIGHT CIRCULAR POLARIZATION TRANSMISSION | No | TRANSMISSION POLARIZATION | RECEPTION POLARIZATION | TRANSMISSION PHASE [rad] | RECEPTION PHASE [rad] |
|---|---|---|---|---|---|
| | 1~N | V | H+V | $\phi(i)$ | $\phi(i)$ |
| | N+1~2N | H | | $\phi(i)-\pi/2$ | |

$\phi(i) = -2\pi \cdot i \cdot d \cdot \sin(\beta\ \alpha)/\lambda$ : CONTROLLED PHASE IN BEAM DIRECTIVITY i · ELEMENT NUMERAL, $\lambda$ · WAVELENGTH

FIG. 8

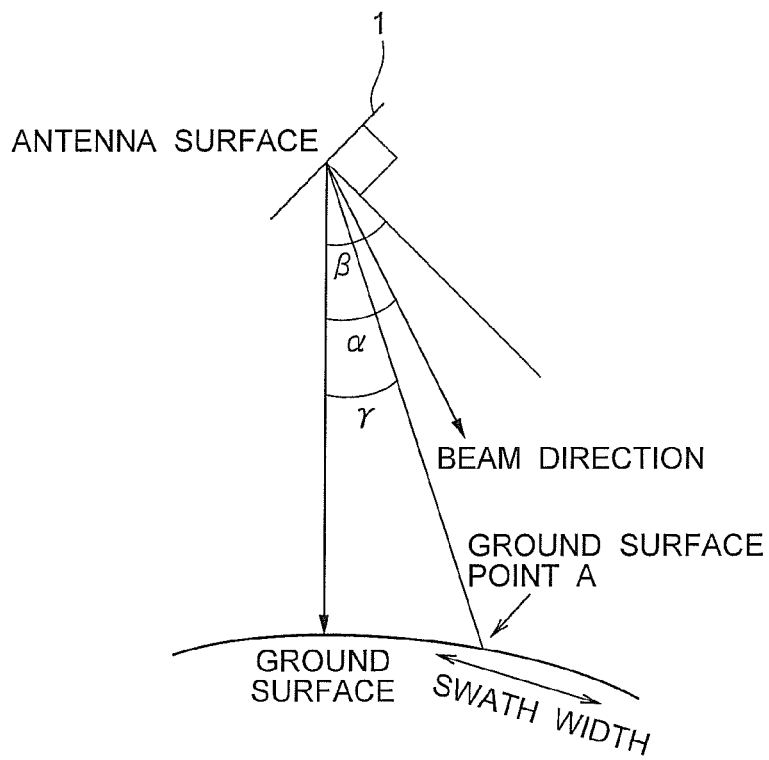

| SETTING | RELATIVE PHASE BETWEEN HORIZONTAL POLARIZATION AND VERTICAL POLARIZATION AT POINT A |
|---|---|
| IN 45 DEGREES LINEAR POLARIZATION TRANSMISSION SETTING | $\delta\phi = 2\pi \cdot N \cdot d/\lambda \cdot (\sin(\beta-\gamma)-\sin(\beta-\alpha))$ |
| IN LEFT CIRCULAR POLARIZATION TRANSMISSION SETTING | $\delta\phi = 2\pi \cdot N \cdot d/\lambda \cdot (\sin(\beta-\gamma)-\sin(\beta-\alpha))+\pi/2$ |
| IN RIGHT CIRCULAR POLARIZATION TRANSMISSION SETTING | $\delta\phi = 2\pi \cdot N \cdot d/\lambda \cdot (\sin(\beta-\gamma)-\sin(\beta-\alpha))-\pi/2$ |

FIG.10

| | Az → | |
|---|---|---|
| TRANSMISSION: V POLARIZATION/ +0 DEGREE<br>RECEPTION: H POLARIZATION/ +0 DEGREE | | TRANSMISSION: V POLARIZATION/ +0 DEGREE<br>RECEPTION: V POLARIZATION/ +0 DEGREE |
| TRANSMISSION: H POLARIZATION/ +0 OR +/− 90 DEGREES<br>RECEPTION: H POLARIZATION/ +0 DEGREE | | TRANSMISSION: H POLARIZATION/ +0 OR +/− 90 DEGREES<br>RECEPTION: V POLARIZATION/ +0 DEGREE |

El →

SYNTHETIC APERTURE RADAR, COMPACT POLARIMETRIC SAR PROCESSING METHOD AND PROGRAM

CROSS-REFERENCE TO RELATED APPLICATION

This application is based upon and claims the benefit of priority from Japanese patent application No. 2007-244034, filed on Sep. 20, 2007, the disclosure of which is incorporated herein in its entirety by reference.

BACKGROUND OF THE INVENTION

1. Field of the Invention

An exemplary aspect of the present invention relates to a synthetic aperture radar for achieving a compact polarimetric SAR for transmitting a circular polarization or a linear polarization and receiving vertical and horizontal polarizations, using a general-purpose phased array antenna for vertical and horizontal polarizations.

2. Description of the Related Art

Data of a synthetic aperture radar (SAR) with respect to a transmission polarization and a reception polarization can be formed by combining a horizontal polarization (an H polarization) and a vertical polarization (a V polarization), to be four kinds of polarization states such as a horizontal-horizontal polarization (HH), a horizontal-vertical polarization (HV), a vertical-vertical polarization (VV), and a vertical-horizontal polarization (VH).

With the above four kinds of polarization data, a reflection polarizational characteristics of an observed object can be reproduced completely. To obtain four kinds of the polarizations simultaneously, a full polarimetric SAR is generally required. In the full polarimetric SAR, the horizontal polarization and the vertical polarization are transmitted alternately at every pulse, and both of the polarizations are received simultaneously, to obtain four kinds of polarization data.

Particularly in a satellite SAR, a swath width and a data amount with the full polarimetric SAR become problems. Therefore, the compact polarimetric SAR has been proposed recently. The compact polarimetric SAR performs transmission by using a circular polarization or a 45 degrees linear polarization, and performs reception of two polarizations of the horizontal polarization and the vertical polarization. The compact polarimetric SAR uses reflection characteristics of radar and performs a statistical processing so as to reproduce four kinds of the polarization states. A method using this technique is described in "Compact Polarimetry Based on Symmetry Properties of Geophysical Media: The π/4 Mode" by Jean-Claude Souyris, Roger Fjrtoft, Sandra Mingot, and Jong-Sen Lee, in IEEE TRANSACTIONS ON GEOSCIENCE AND REMOTE SENSING, 2005 (Non-Patent Document 1), for example. Further, "Hybrid-Polarity SAR Architecture" by R. Keith Raney, in IGARSS' 2006 (Non-Patent Document 2), discloses a structure for achieving a compact poralimetric SAR by using a commonly-used antenna.

However, in the compact polarimetric SARs disclosed in Non-Patent Documents 1 and 2, different kinds of polarizations are required to be used, that is, the circular polarization or the 45 degrees linear polarization is required for transmission, and the horizontal polarization and the vertical polarization are required for reception, and therefore a problem is that a structure of the SAR becomes complicated.

Further, the structure becomes more complicated when it is intended to be applied to a conventional full polarimetric SAR or SARs using a single polarization such as the horizontal-horizontal (HH) polarization, the vertical-vertical (VV) polarization and the like. That ends up a problem in which mass grows, loss in antenna increases, and reliability degreases.

Furthermore, a technique in Japanese Patent Application Laid-open No. 2006-322848 (Patent Document 1) is for a full polarimetric SAR which transmits a horizontal polarization (H) and a vertical polarization (V) alternately. However, the way of achieving an SAR is completely different from that of the compact polarimetric SAR in the present invention, which transmits the horizontal polarization (H) and the vertical polarization (V) simultaneously.

Moreover, Japanese Patent Application Laid-open No. 2002-064321 (Patent Document 2) discloses a structure in which a third array antenna having a given polarization characteristic and a fourth array antenna having a polarizational characteristic orthogonal to the polarizational characteristic of the third array antenna are combined, and Japanese Patent Application Laid-open No. 03-089606 (Patent Document 3) discloses a structure in which all polarizations are set in the vertical or the horizontal polarization by setting a relative phase to be in a same phase. However, in order to use different kinds of polarizations, namely using the circular polarization or the 45 degrees linear polarization in transmission and using the horizontal polarization and the vertical polarization in reception, it is required that an H polarization radiating element and a V polarization radiating element, which share a phase center, are to be fed simultaneously for transmission, and such a problem causes the structure of a compact polarimetric SAR to be complicated.

SUMMARY OF THE INVENTION

An exemplary object of the present invention is to provide a synthetic aperture radar for achieving a compact polarimetric SAR easily, by using a general-purpose phased array antenna for vertical and horizontal polarizations.

To achieve the above exemplary object, a synthetic aperture radar according to an exemplary aspect of the invention includes: an antenna section; an electric circuit section with a control section; an SAR image reproducer; and a compact polarimetric SAR processor; wherein the antenna section is a phased array antenna for vertical and horizontal polarizations capable of switching to a horizontal polarization or a vertical polarization in transmission at every transmission/reception module, and of receiving two polarizations of the horizontal polarization and the vertical polarization simultaneously, the control system divides electrically an antenna surface of the phased array antenna at a time of transmission to set one of divided surfaces for a horizontal polarization transmission and the other of divided surfaces for a vertical polarization transmission, and, at a time of reception, sets the antenna for dual polarization simultaneous reception to receive the horizontal polarization and the vertical polarization, and the compact polarimetric SAR processor takes a horizontal polarization receiving data and vertical polarization receiving data, which are complex data transmitted and received by the antenna section and the electric circuit section and then imaged by the SAR image reproducer respectively, as a target vector, and obtains a calculation result corresponding to a covariance matrix of a target vector in full polarimetry so as to perform a compact polarimetric SAR processing.

A program according to another exemplary aspect of the invention makes a computer, which controls a phased array antenna for vertical and horizontal polarizations capable of switching to a horizontal polarization or a vertical polarization in transmission at every transmission/reception module, and of receiving two polarizations of the horizontal polarization and the vertical polarization simultaneously, execute the functions of:

dividing electrically an antenna surface of the phased array antenna at a time of transmission to set one of divided surfaces for horizontal polarization transmission and the other of divided surfaces for vertical polarization transmission, and, at a time of reception, setting the antenna for dial polarization simultaneous reception to receive the horizontal polarization and the vertical polarization.

A program according to still another exemplary aspect of the invention makes a computer, which performs a compact polarimetric SAR processing based on a signal received by a phased array antenna for vertical and horizontal polarizations, execute the functions of:

taking complex data of horizontal polarization receiving data and vertical polarization receiving data as a target vector and obtaining data of a covariance matrix with respect to the target vector, in accordance with a space average of adjacent pixels;

obtaining a look angle at an observed point in an image based on a geometric relationship, and obtaining a relative phase between a horizontal polarization and a vertical polarization based on the obtained look angle;

outputting a calculation result corresponding to a covariance matrix of a target vector in full polarimetry in accordance with data of the covariance matrix and data of the relative phase between the horizontal polarization and the vertical polarization; and performing a compact polarimetric SAR processing in response to the relative phase depending on a position in a range direction of a swath width in simultaneous transmission of horizontal and vertical polarizations.

A compact polarimetric SAR processing method according to still another exemplary aspect of the invention, using a phased array antenna for vertical and horizontal polarizations capable of switching to a horizontal polarization or a vertical polarization in transmission at every transmission/reception module and of receiving two polarizations of the horizontal polarization and the vertical polarization simultaneously, for performing a compact polarimetric SAR processing in response to a relative phase depending on a position in a range direction of a swath width in simultaneous transmission of horizontal and vertical polarization, in accordance with a signal received by the phased array antenna, the method includes the steps of:

dividing electrically an antenna surface of the phased array antenna at a time of transmission to set one of divided surfaces for horizontal polarization transmission and the other of divided surfaces for vertical polarization transmission, and, at a time of reception, setting for dual polarization simultaneous reception to receive the horizontal polarization and the vertical polarization; and taking complex data of horizontal polarization receiving data and vertical polarization receiving data as a target vector and obtaining a calculation result corresponding to a covariance matrix of a target vector in full polarimetry to perform a compact polarimetric SAR processing.

BRIEF DESCRIPTION OF THE DRAWINGS

FIG. 6 is a diagram showing a signal path in reception according to the exemplary embodiment of the invention;

FIG. 7 is a diagram showing one example of polarization and phase setting for an antenna surface according to the exemplary embodiment of the invention;

FIG. 8 is a diagram showing a relationship of relative phases between a horizontal polarization and a vertical polarization according to the exemplary embodiment of the invention;

FIG. 10 is a diagram showing another example of setting for polarizations and additional phases with respect to the phased array antenna according to an exemplary embodiment of the invention;

DESCRIPTION OF EXEMPLARY EMBODIMENTS

Hereinafter, an exemplary embodiment of the invention will be explained in detail with reference to the drawings.

Figure 1:
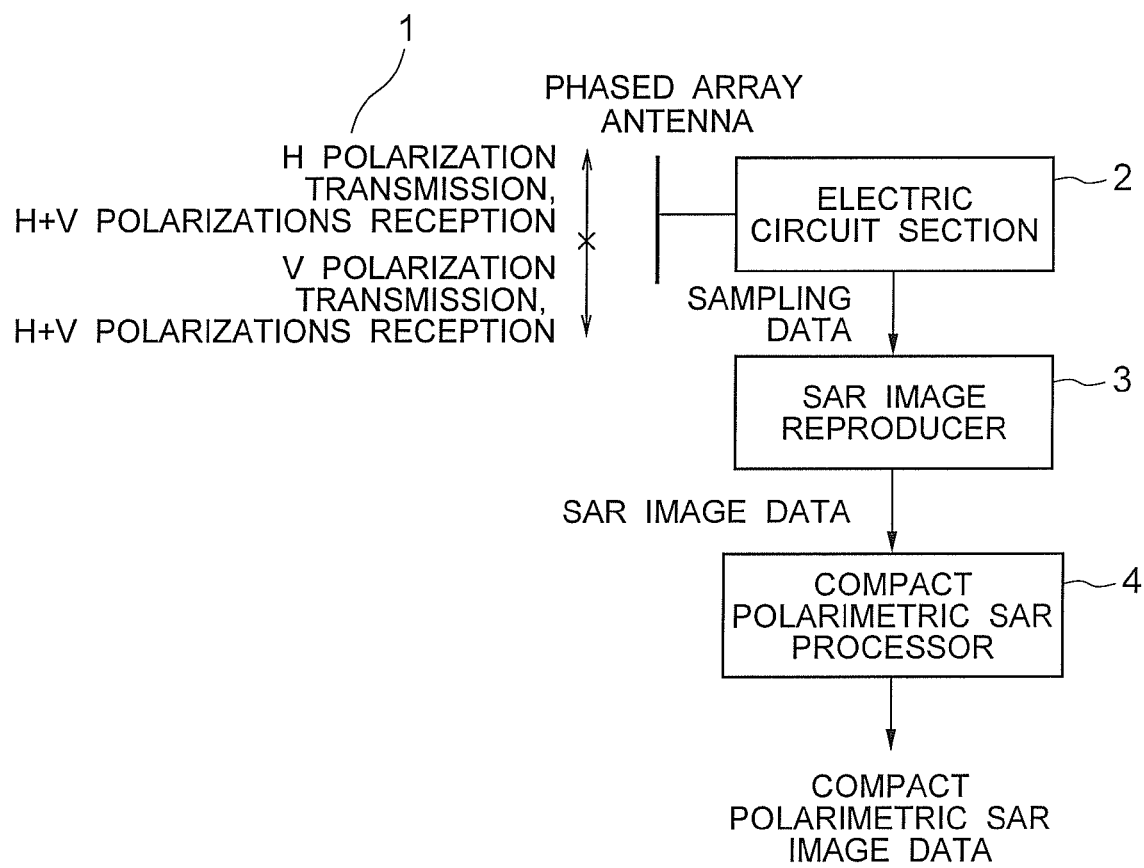
FIG. 1 is a block diagram showing a fundamental structure of a synthetic aperture radar according to an exemplary embodiment of the invention.

A fundamental structure of the exemplary embodiment according to the invention will be described with reference to FIGS. 1 and 2. In the exemplary embodiment of the invention, as shown in FIG. 1, a phased array antenna for vertical and horizontal polarizations is used as an antenna section 1. The phased array antenna is used for realizing a full polarimetric SAR capable of switching to a horizontal polarization or a vertical polarization in transmission at every transmission/reception module and of receiving two polarizations of the horizontal polarization and the vertical polarization simultaneously. Under control of an electric circuit section 2, especially a control system 25 thereof, the phased array antenna surface is divided electrically so as to be arranged in an elevation direction, and one of divided surfaces is set for horizontal polarization transmission and the other of divided surfaces is set for vertical polarization transmission respectively. Then, under control of the control system 25, the phased array antenna is set for dual polarization simultaneous reception to receive the horizontal polarization and the vertical polarization, in a same way with a general-purpose full polarimetric SAR. Further, under control of the control system 25, a phase in a transmission/reception module is set to be a phase required for controlling beam directivity so as to realize a compact polarimetric SAR for linear polarization transmission (especially for 45 degrees linear polarization transmission). Also, under control of the control system 25, a phase difference between the transmission/reception module for the horizontal polarization transmission and the transmission/reception module for the vertical polarization transmission is shifted (especially by $\pi/2$ radians (90 degrees)) only in transmission, in addition to the phase setting required for controlling the beam directivity, so as to realize a compact poralimetric SAR for circular polarization transmission. Further, because transmission out of a central beam becomes neither the transmission in the complete linear polarization nor the transmission in the complete circular polarization, but becomes elliptical polarization transmission, a compact polarimetric SAR processing is performed so as to respond to a shift of relative phase between the horizontal polarization and the vertical polarization according to a point in a swath width.

Figure 2:
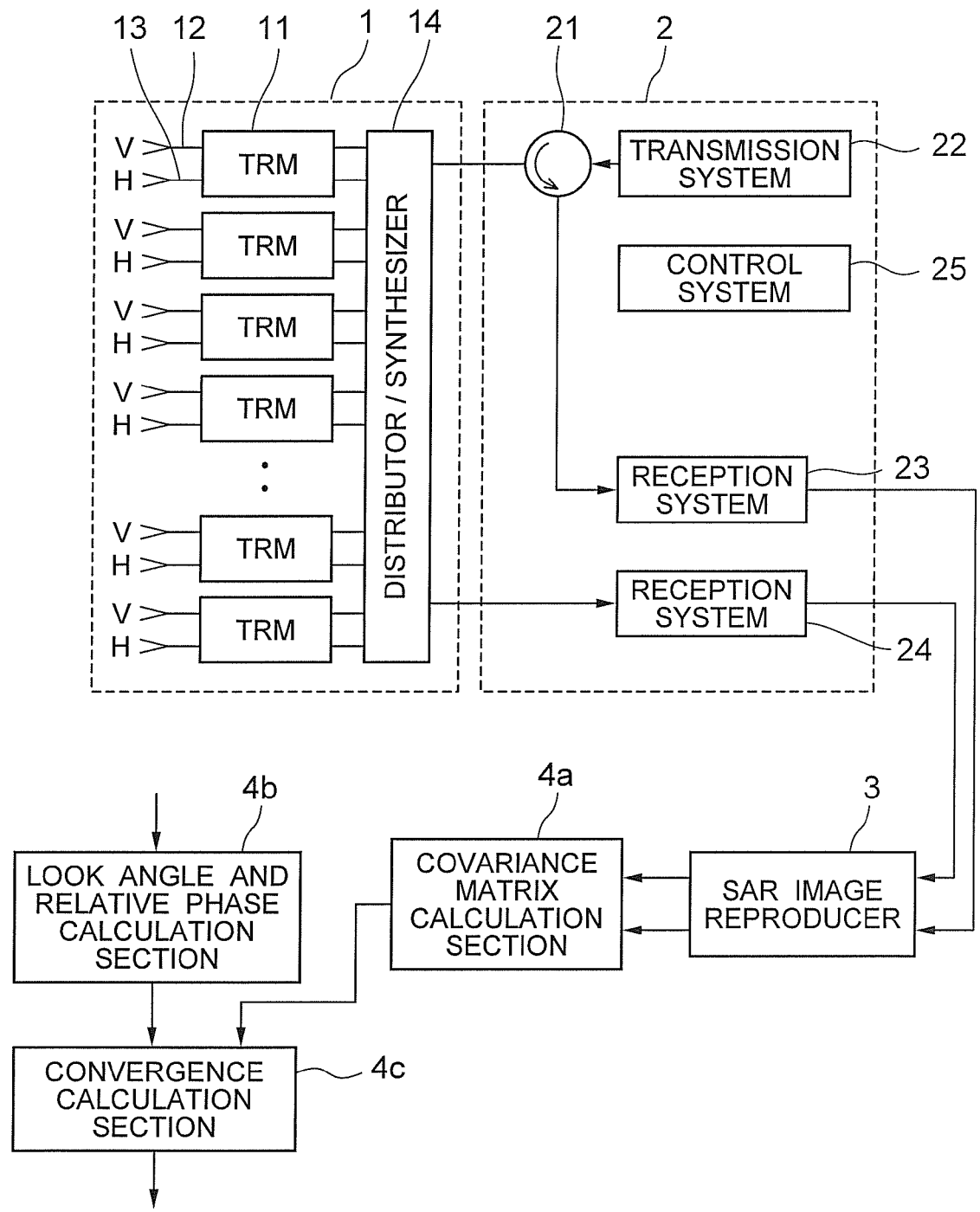
FIG. 2 is a block diagram showing one specific example of the synthetic aperture radar according to the exemplary embodiment of the invention.

A synthetic aperture radar for performing the above described polarimetric SAR processing according to the exemplary embodiment of the invention includes, as shown in FIGS. 1 and 2, the antenna section 1, the electric circuit section 2 with the control system 25, an SAR image reproducer 3, and a compact polarimetric SAR processor 4.

The antenna section 1 is a phased array antenna for vertical and horizontal polarizations capable of switching to the horizontal polarization or the vertical polarization in transmission at every transmission/reception module, and of receiving two polarizations of the horizontal polarization and the vertical polarization simultaneously. The control system 25 divides electrically the phased array antenna in two so as to be arranged in the elevation direction at a time of transmission, and sets one of divided antennas for the horizontal polarization transmission and the other of divided antennas for the vertical polarization transmission respectively, and at a time of reception, sets the antenna for dual polarization simultaneous reception to receive the horizontal polarization and the vertical polarization. Further, the compact polarimetric SAR processor 4 takes complex data of horizontal polarization receiving data and vertical polarization receiving data, which are transmitted and received by the antenna section 1 and the electric circuit section 2 and imaged by the SAR image reproducer respectively, as a target vector, and obtains a calculation result corresponding to a covariance matrix of a target vector in pull polarimetry so as to perform the compact polarimetric SAR processing.

The control system 25 may set a phase of transmission/reception modules in the phased array antenna 1 to be a phase required for controlling the beam directivity so as to control the linear polarization transmission (especially the 45 degrees linear polarization transmission). The control system 25 may also shift a phase difference between the transmission/reception module for the horizontal polarization transmission and the transmission/reception module for the vertical polarization transmission (especially by $\pi/2$ (90 degrees)), in addition to the phase setting required for controlling the beam directivity, so as to control the circular polarization transmission.

As shown in FIG. 2, a compact polarimetric SAR processor 4 includes a covariance matrix calculation section 4a performing a compact polarimetric SAR processing corresponding to a relative phase depending on a position in a range direction of a swath width in simultaneous transmission of a horizontal polarization and a vertical polarization; a look angle and relative phase calculation section 4b; and a convergence calculation section 4c; wherein the covariance matrix calculation section 4a takes complex data of horizontal polarization receiving data and vertical polarization receiving data as a target vector, and obtains covariance matrix data in accordance with a space average of adjacent pixels with respect to the target vector, the look angle and relative phase calculation section 4b obtains a look angle at an observed point in an image based on a geometric relationship, and obtains a relative phase between the horizontal polarization and the vertical polarization in accordance with the obtained look angle, and the convergence calculation section 4c outputs a calculation result corresponding to a covariance matrix of a target vector in full polarimetry based on the data of the covariance matrix and data of the relative phase between the horizontal polarization and the vertical polarization.

In the above, the control system 25 of the electric circuit 2 and the compact polarimetric SAR processor 4 are established as hardware, however, functions performed by the control system 25 and the compact polarimetric SAR processor 4 may be configured as software and a program may make a computer execute those functions.

Next, an exemplary embodiment of the invention will be explained in further detail using a specific example.

As shown in FIG. 1, a fundamental structure of the synthetic aperture radar according to the exemplary embodiment of the invention includes the antenna section 1, the control system 25 of the electric circuit section 2, the SAR image reproducer 3 for reproducing SAR image data from sampling data, and the compact polarimetric SAR processor 4 for generating compact polarimetric SAR image data from the SAR image data.

Hereinafter, specific structures for the antenna section 1, the electric circuit section 2, and the compact polarimetric SAR processor 4 will be described. It is noted that, as for the SAR image reproducer 3, a general-purpose one is used. The SAR image reproducer 3 may have any structure as long as it can reproduce the SAR image data based on the sampling data outputted by reception systems 23 and 24 shown in FIG. 2. The SAR image reproducer does not include characteristics according to the exemplary embodiment of the invention, thus the detailed explanation therefor is omitted.

As shown in FIG. 2, the electric circuit section 2 is composed of a single transmission system 22 for generating a transmitting signal and outputting the transmitting signal to the antenna section 1, two reception systems 23 and 24 for receiving signals of two polarizations from the antenna section 1 and sampling those receiving signals, and the control system 25 for performing overall control.

The antenna section 1 is composed of a plurality of transmission/reception modules (TRM) 11, V polarization radiating elements 12 and H polarization radiation elements 13 each of which are connected to the transmission/reception modules 11 respectively, a distributor/synthesizer 14 for distributing the transmitting signal between each transmission/reception module 11 and the electric circuit section 2, and synthesizing the receiving signal.

Each of the transmission/reception modules 11 is connected with both the V polarization radiating element 12 and the H polarization radiating element 13. The transmission/reception modules 11 can output a transmitting signal to either the V polarization radiating element 12 or the H polarization radiating element 13, and can receive signals from both of the V polarization radiating element 12 and the H polarization radiating element 13.

Figure 4:
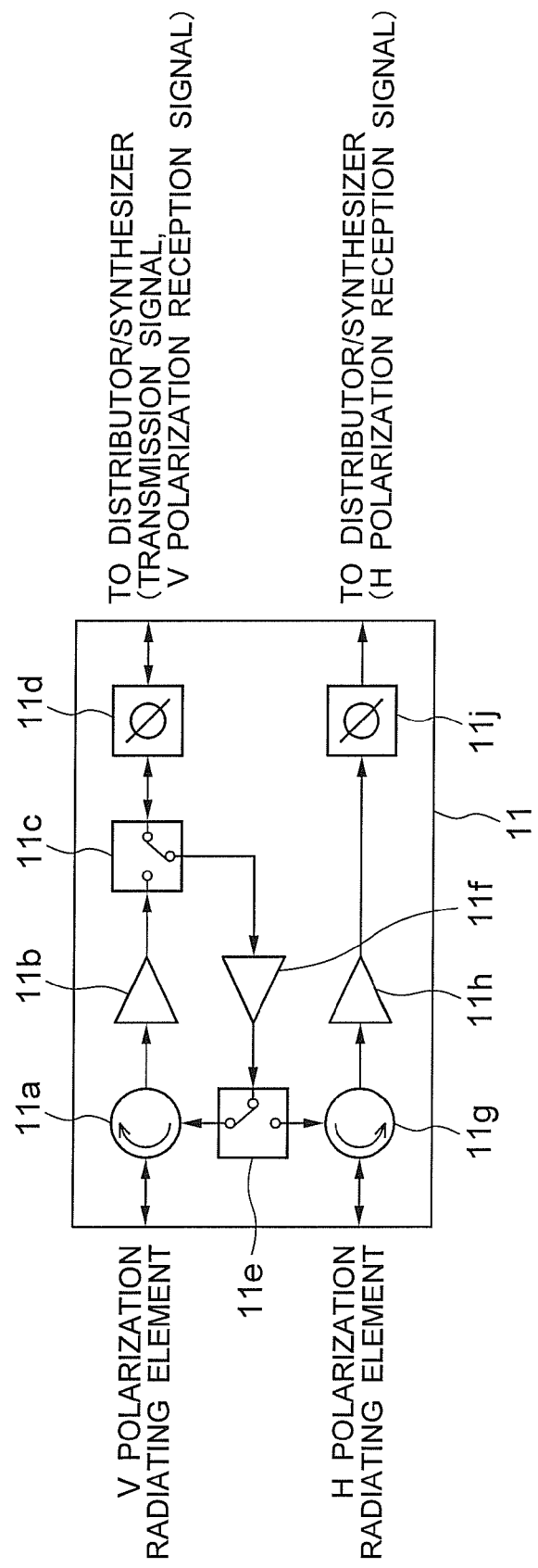
FIG. 4 is a block diagram showing one specific example of a transmission/reception module according to the exemplary embodiment of the invention.

As shown in FIG. 4, the transmission/reception module 11 has a general structure including phase shifters 11d, 11j capable of shifting a phase according to every transmission, reception, and at every polarization, LNAs 11b, 11h, an HPA 11f, switches 11c, 11e, circulators 11a, 11g, and the like. The transmission/reception module 11 has a general structure with which the transmission/reception module 11 can transmit to either the V polarization radiating element 12 or the H polarization radiating element 13 at one pulse (there is no need to transmit simultaneously). Further, the transmission/reception module 11 can receive signals from both the V polarization radiating element 12 and the H polarization radiating element 13 simultaneously.

The control system 25 shown in FIG. 2 performs overall control for the electric circuit section 2. In addition, the control system 25 sets a phase of the transmission/reception modules in the phased array antenna 1 to a phase required for controlling beam directivity so as to control the linear polarization transmission (especially the 45 degrees linear polarization), and the control system 25 shifts a phase difference between the transmission/reception module for the horizontal polarization transmission and the transmission/reception module for the vertical polarization transmission (especially by $\pi/2$ (90 degrees)) so as to control the circular polarization transmission, in addition to the phase setting required for controlling the beam directivity. In the above, the control system 25 of the electric circuit 2 is established as hardware, however, a function executed by the control system 25 may be established as software so that a program makes a computer execute the function.

The compact polarimetric SAR processor 4 shown in FIG. 2 includes the covariance matrix calculation section 4a for performing the compact polarimetric SAR processing corresponding to a relative phase depending on a position in the range direction of the swath width at the simultaneous transmission in the horizontal polarization and the vertical polarization, the look angle and relative phase calculation section 4b, and the convergence calculation section 4c. The covariance matrix calculation section 4a takes the complex data of the horizontal polarization receiving data and the vertical polarization receiving data as a target vector, and the covariance matrix data is obtained by using a space average of adjacent pixels with respect to the target vector. The look angle and relative phase calculation section 4b obtains a look angle at an observed point in an image based on a geometric relationship, and obtains a relative phase between the horizontal polarization and a vertical polarization in accordance with the obtained look angle. The convergence calculation section 4c outputs a calculation result corresponding to a covariance matrix of a target vector in full polarimetry based on the data of the covariance matrix and the data of the relative phase between the horizontal polarization and the vertical polarization. In the above, the compact polarimetric SAR processor 4 is established as hardware, however, a function executed by the compact polarimetric SAR processor 4 may be established as software so that a program makes a computer execute the function.

Next, a case will be explained in which a polarimetric SAR processing method is performed using the synthetic aperture radar according to the exemplary embodiment of the invention shown in FIG. 2.

Figure 3:
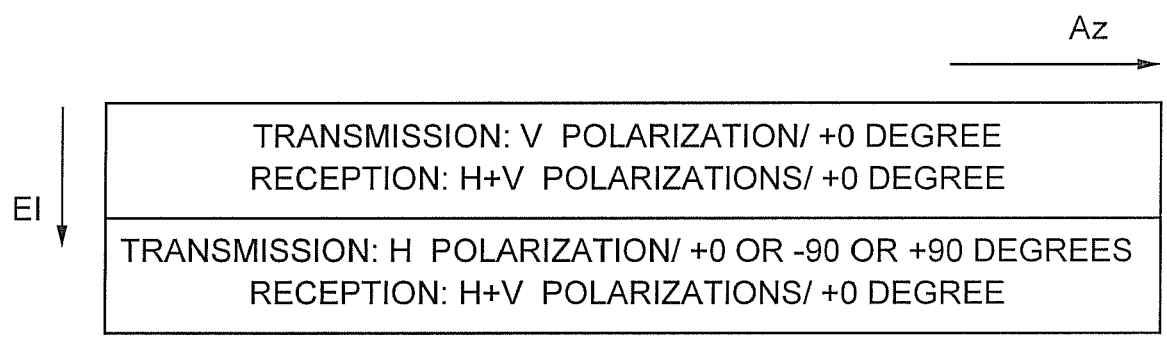
FIG. 3 is a diagram showing one example of setting for polarizations and additional phases with respect to a phased array antenna in the exemplary embodiment of the invention.

FIG. 3 is a front view of the phased array antenna 1 showing a setting for polarizations and phases of the transmission/reception module in the antenna. In FIG. 3, a widthwise direction indicates an azimuth (Az) direction and a vertical direction indicates an elevation (EL) direction. In the example of FIG. 3, an antenna surface of the phased array antenna 1 is divided into two. Then, an upper half of the antenna surface is set for the V polarization/0 degree transmission, and the H+V polarizatio/0 degree reception. An lower half is set for the H polarization/+0 degree, −90 degree, or +90 degree transmission, and the H+V polarization/+0 degree reception.

FIG. 7 shows a setting for polarizations and phases in the antenna surface according to the exemplary embodiment, in which the plurality of H polarization elements 12 and the plurality of V polarization elements 13 in the phased array antenna 1 form the antenna surface. A downward direction in FIG. 7 is a direction in right below the antenna surface. A direction at an angle β is a direction of normal line of the antenna. A beam is radiated from the antenna surface at an angle α (a beam direction). In FIG. 6, a direction along the diagonal antenna surface is the elevation direction (EL).

In FIG. 7, Nos. 1-2N written in the "No" section indicate numerals for each polarization element 12, 13 corresponding to respective transmission/reception modules 11. Further, "transmission polarization" section indicates that the antenna surface shown in FIG. 3 is divided into two so as to be arranged in the elevation (EL) direction. Specifically, the antenna surface including the plurality of elements 12 and 13 of the transmission/reception modules 11 is divided into the upper half antenna surface formed with the elements Nos. 1-N and the lower half formed with the elements Nos. N+1-2N. The upper half of the antenna surface transmits with the V polarization, and the lower half of the antenna surface transmits with the H polarization. In FIG. 7, transmission polarizations and transmission phases are described with respect to each the 45 degrees linear polarization transmission, the left circular polarization transmission, and the right circular polarization transmission, and in addition, reception polarizations and reception phases are also described.

In reception with the antenna surface of the phased array antenna 1, all transmission/reception modules 11 receive the H polarization and the V polarization simultaneously.

Figure 5:
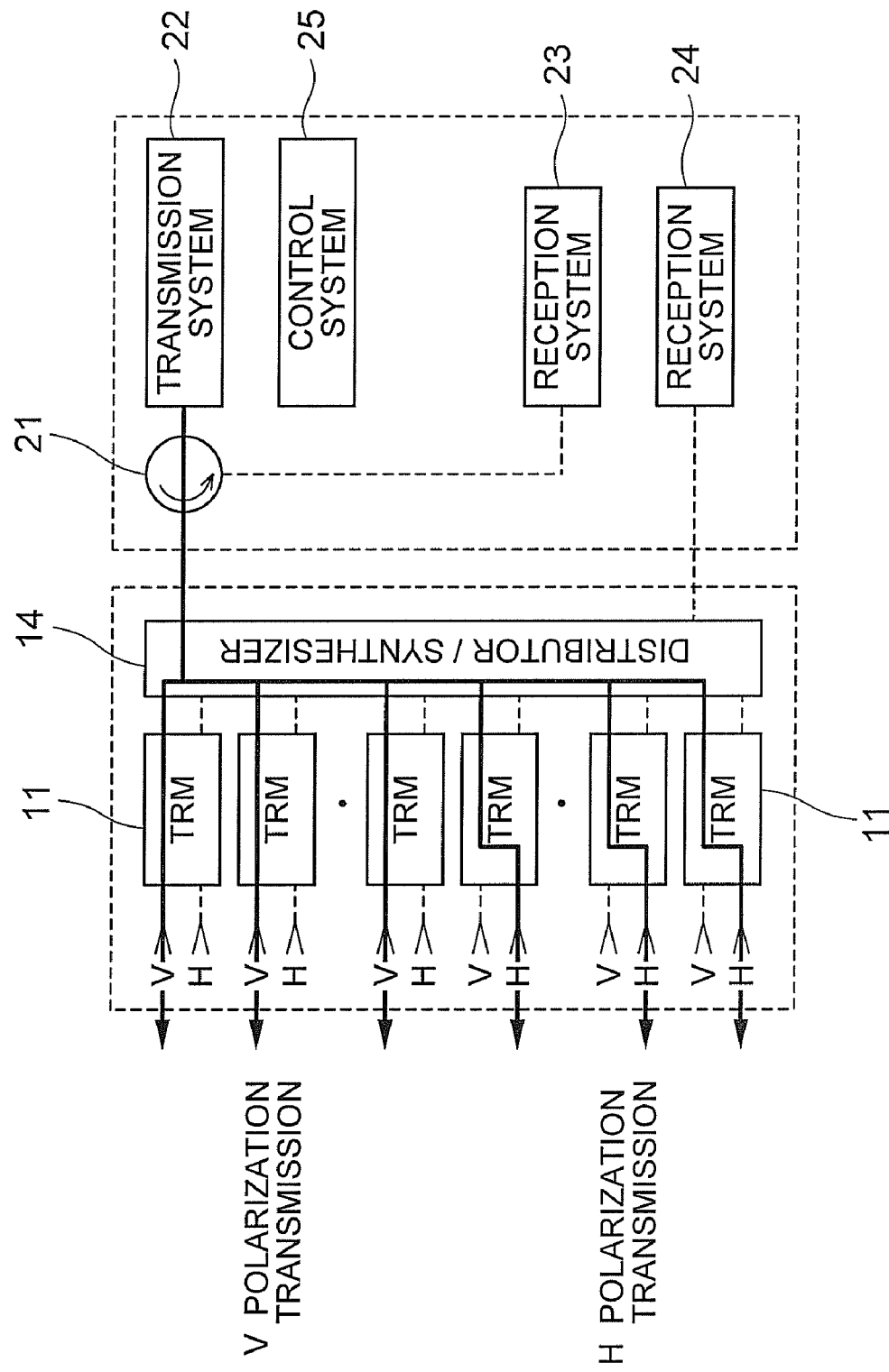
FIG. 5 is a diagram showing a signal path in transmission according to the exemplary embodiment of the invention.

According to the exemplary embodiment, a signal path in transmission is shown by a bold arrow in FIG. 5, and a signal path in reception is shown by a bold arrow in FIG. 6.

Further, the control system 25 in electric circuit 2 sets a phase of the transmission/reception module 11, at simultaneous reception, in a phase φ (i) required for an angle with which a prescribed beam scanning is performed. The phase φ (i) is expressed by an equation (1). In the equation (1), the phase φ (i) represents a phase corresponding to the number of the transmission/reception module 11, d represents an inter-element spacing between the transmission/reception module 11 of No. i and the adjacent updated module 11, λ represents a wavelength, β represents a direction of the antenna normal line in FIG. 7, and α represents a beam direction with respect to the antenna surface.

$$\phi(i) = -\{2\pi \ast i \ast d \ast \sin(\beta - \alpha)\}/\lambda \tag{1}$$

Further, when transmitting, the control system 25 of electric circuit 2 sets a transmitting phase of the transmission/reception module with respect to the lower half only in the antenna surface, adding 0 radians, +π/2 radians (90 degrees), or −π/2 radians (−90 degrees), in addition to setting the phase φ (i) expressed by the equation (1). Or inversely, the control system 25 may set a transmitting phase of the transmission/reception module with respect to the upper half only in the antenna surface, adding 0 radians, +π/2 radians (90 degrees), or −π/2 radians (−90 degrees).

Under the above mentioned control of the control system 25, the transmission with the V polarization is performed by the upper half of the antenna surface, and the transmission with the H polarization in a 0 or π/2 radian retardation (progression) phase is performed by the lower half of the antenna surface. Consequently, the transmission with the 45 degrees linear polarization or the circular polarization is performed by the antenna surface as a whole. As for the reception, both the H polarization and the V polarization are received simultaneously by the plurality of transmission/reception modules 11. Accordingly, the compact polarimetry can be achieved. The phase actually set in the transmission/reception modules 11 corresponds to a remainder (0–2π radians) when the phase is divided by 2π radians.

In this case, the 45 degrees linear polarization or the circular polarization can be obtained in a complete form only when transmitted in the beam direction (a center of the beam directivity) shown in FIG. 7. The relative phase between the horizontal polarization and the vertical polarization depends on a position in the range direction of the swath width, and may become the elliptical polarization.

In FIG. 8, an angle of a point A on a ground surface with respect to a direction in right below the antenna is to be a look angle λ when the point A on the ground surface is observed with a beam radiated from the antenna surface. Then, the relative phase δφ between the horizontal polarization and the vertical polarization at the point A on the ground surface, corresponding to the look angle γ, is expressed by equations (2a)-(2c). The relative phase δφ in the 45 degrees linear polarization transmission is expressed by an equation (2a), the relative phase δφ in the left circular polarization transmission is expressed by an equation (2b), and the relative phase δφ in the right circuit polarization transmission is expressed by an equation (2c) as follows:

The relative phase δφ in the 45 degrees linear polarization transmission $$\delta\phi = 2\pi * N * d/\lambda * (\sin(\beta-\gamma) - \sin(\beta-\alpha)) \quad (2a)$$

The relative phase δφ in the left circular polarization transmission $$\delta\phi = 2\pi * N * d/\lambda * (\sin(\beta-\gamma) - \sin(\beta-\alpha)) + \pi/2 \quad (2b)$$

The relative phase δφ in the right circular polarization transmission $$\delta\phi = 2\pi * N * d/\lambda * (\sin(\beta-\gamma) - \sin(\beta-\alpha)) - \pi/2 \quad (2c)$$

FIG. 8 shows a relationship between settings in the 45 degrees linear polarization transmission, the left circular polarization, the right circular polarization, and the relative phases of the horizontal polarization and the vertical polarization at the point A.

The compact polarimetric SAR processor 4 performs the compact polarimetric SAR processing in response to the relative phases δφ expressed by the equations (2a), (2b), and (2c) depending on a position in the range direction of the swath width on the ground surface shown in FIG. 8. A compact polarimetric SAR processing in a case with the 45 degrees linear polarization (δφ=0) is described in Non-Patent Document 1, for example. On the other hand, as for the compact polarimetric SAR according to the exemplary embodiments, the processing in response to the relative phase δφ is performed because the polarization is the elliptical polarization in which the relative phase δφ shifts depending on a position within the swath width on the ground surface shown in FIG. 8.

Processing according to the compact polarimetric SAR processor 4 will be explained in detail with reference to FIG. 9. The covariance calculation section 4a in the compact polarimetric SAR processor inputs data outputted from the SAR image reproducer 3 (Step S1 in FIG. 9). The data outputted from the SAR image reproducer 3 is the SAR image data. Each pixel in the SAR image is composed of two pieces of data $k_{\phi H}$ and $k_{\phi V}$, i.e., the horizontal polarization receiving data and the vertical polarization receiving data. Two pieces of the data $k_{\phi H}$ and $k_{\phi V}$ are complex data respectively. When both of the polarization data are taken as a vector, a target vector kφ is obtained, and is defined by an equation (3).

(Equation 3)

$$\vec{k}_\phi = {}^t[k_{\phi H}, k_{\phi V}] \quad (3)$$

Figure 9:
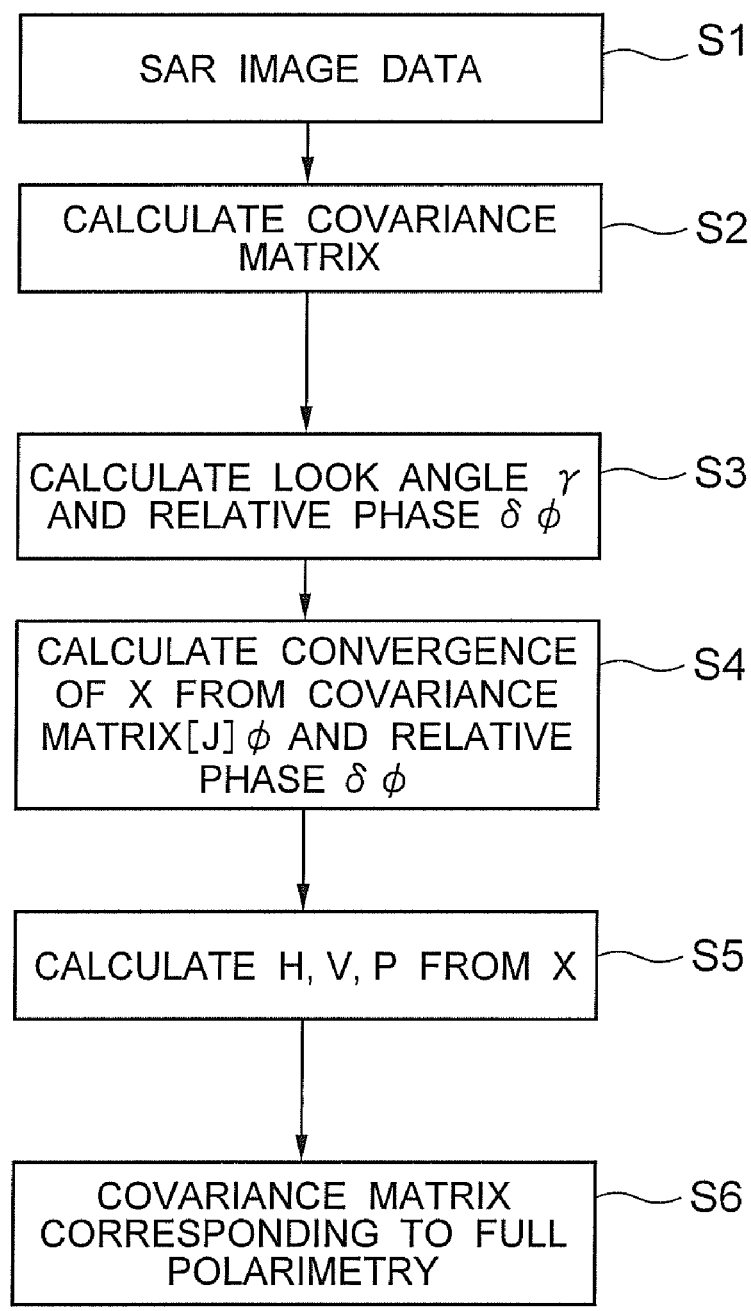
FIG. 9 is a flowchart showing a compact polarimetric SAR processing according to the exemplary embodiment of the invention.

The covariance calculation section 4a obtains a covariance matrix by an equation (4) in accordance with a space average of adjacent pixels (Step S2 in FIG. 9).

(equation 4)

$$[\bar{J}]_\phi = \langle \vec{k}_\phi \cdot \vec{k}_\phi^{*} \rangle \quad (4)$$
$$= \begin{bmatrix} J_{\phi 11} & J_{\phi 12} \\ J_{\phi 12}^* & J_{\phi 22} \end{bmatrix}$$
$$= \begin{bmatrix} \langle k_{\phi H} \cdot k_{\phi H}^* \rangle & \langle k_{\phi H} \cdot k_{\phi V}^* \rangle \\ \langle k_{\phi V} \cdot k_{\phi H}^* \rangle & \langle k_{\phi V} \cdot k_{\phi V}^* \rangle \end{bmatrix}$$

In the equation (4), a superscript asterisk * in a right side expresses a complex conjugate, and operators expressed by square brackets express a space average between the adjacent pixels.

The look angle and relative phase calculation section 4b in compact polarimetric SAR processor obtains a look angle γ at the point A on the ground surface in an image, based on a geometric relationship shown in FIG. 8. Further, the look angle and relative phase calculation section 4b obtains a relative phase δφ between the horizontal polarization and the vertical polarization by the equation (2) (equations (2a), (2b), (2c)), in accordance with the obtained γ (Step S3 in FIG. 9).

Next, the convergence calculation section 4c in the compact polarimetric SAR processor 4 calculates H, V, X, P respectively by the convergence calculations with equations (5)-(9) based on the covariance matrix (the equation (4)) obtained by the covariance calculation section 4a and the relative phase δφ (FIG. 8) obtained by the look angle and relative phase calculation section 4b (Steps S4 and S5 in FIG. 9).

Specifically, the convergence calculation section 4c firstly calculates a value of $|\rho_{H\text{-}V}|$ using the equation (5), with assuming that a variance of cross polarization data is X, and setting X=0 as an initial value. The value of $|\rho_{H\text{-}V}|$ is assigned to the equation (6) so as to calculate a value of variance X for the cross polarization data. The convergence calculation section 4c again assigns the variance X of the cross polarization data to the equation (5). Repeating those calculations, the convergence calculation section 4c converges the value of $|\rho_{H\text{-}V}|$ and the variance X of the cross polarization data.

(equation 5)

$$|\rho_{H-V}| = \frac{|J_{\phi 12} - \exp(j \cdot \delta\phi) \cdot X|}{\sqrt{(J_{\phi 11} - X) \cdot (J_{\phi 22} - X)}} \quad (5)$$

(equation 6)

$$X = \frac{(1 - |\rho_{H-V}|) \cdot (J_{\phi 11} + J_{\phi 22})}{2 \cdot (3 - |\rho_{H-V}|)} \quad (6)$$

Next, the convergence calculation section 4c assigns the convergent value for the variance X of the cross polarization data into the equations (7)-(9) so as to obtain a variance H of horizontal-horizontal polarization data, a variance V of vertical-vertical polarization data, and a covariance P between the horizontal-horizontal polarization data and the vertical-vertical polarization data. Then, the obtained H, V, X, P are assigned to an equation (11) so as to obtain a calculation result corresponding to a covariance matrix (the equation (11)) of a target vector $k_{FP}$ shown in an equation (10) in the full polarimetry (Step S6 in FIG. 9). In the equation (10), h, x, v correspond to the horizontal-horizontal polarization (HH) data, the vertical-vertical polarization (VV) data, and the cross polarization data (HV) in full polarimetry.

(equation 7)
$$X = J_{\phi 22} - X \quad (7)$$

(equation 8)
$$H = J_{\phi 11} - X \quad (8)$$

(equation 9)
$$P = \exp(j \cdot \delta\phi) \cdot (J_{\phi 12} - \exp(j \cdot \delta\phi) \cdot X) \quad (9)$$

(equation 10)
$$\vec{k}_{FP} = {}^t[h, \sqrt{2x}, v] \quad (10)$$

(equation 11)
$$[\bar{\bar{J}}]_{FP} = \langle \vec{k}_{FP} \cdot {}^t \vec{k}_{FP}^* \rangle = \begin{bmatrix} H & 0 & P \\ 0 & 2X & 0 \\ P^* & 0 & V \end{bmatrix} \quad (11)$$

As described, according to the exemplary embodiment of the invention, a compact polarimetric SAR can be achieved using a general-purpose phased array antenna for vertical and horizontal polarizations. Therefore, there is no need for using a circular polarization transmitter element and a 45 degrees linear polarization transmitter element. Further, there is no need for feeding the horizontal polarization element and the vertical polarization element, which share a phase center, simultaneously in transmission. Thus, the compact polarimetric SAR can be achieved with a simple antenna structure.

Furthermore, since the general-purpose phased array antenna for vertical and horizontal polarizations is used, the invention is applicable not only to the compact polarimetric SAR, but also to the full polarimetric SAR, and the SARs using a single polarization such as the horizontal-horizontal (HH), the vertical-vertical (VV), and the like.

Moreover, the transmission antenna surface of the phased array antenna is divided so as to be arranged in the elevation direction. Therefore, a beam width in the elevation direction in transmission becomes about twice times of a beam width in reception, however, it is nearly the same width as a reception beam of which a synthetic beam width in transmission and reception is narrow. Thus, the exemplary embodiment is efficient not to loose performance much in a virtual image ratio with respect to a signal, and the like.

As an exemplary advantage according to the invention, a compact polarimetric SAR can be achieved by using a general-purpose phased array antenna for vertical and horizontal polarizations. Therefore, there is no need to use a circular polarization transmitting element and a 45 degrees linear polarization transmitting element. Further, a horizontal polarization element and a vertical polarization element, which share a phase center, do not need to be fed simultaneously for transmission. Thus, a compact polarimetric SAR can be achieved with a simple antenna configuration.

Next, another exemplary embodiment of the invention will be explained.

In FIGS. 1 and 2, the upper half of the antenna surface divided into the elevation direction is set for the V polarization transmission, and the lower half of the antenna surface is set for the H polarization transmission. However, the upper half of the divided antenna surface may be inversely set for the H polarization transmission and the lower half may be set for the V polarization transmission. Further, the additional phases shown in FIG. 3 may also be inversed. Furthermore, the additional phases shown in FIG. 3 do not need to be 0, +90 or −90 degrees. In this case, the invention can be achieved by adding the certain additional phases is added to the relative phase $\delta\phi$ between the horizontal polarization and vertical polarization shown in FIG. 8 so as to.

Further, in the example shown in FIG. 2, the H polarization radiating element and the V polarization radiating element are connected to the same transmission/reception module, but those may be connected to the different transmission/reception modules respectively. Moreover, the structure of the transmission/reception module shown in FIG. 4 is one example, and another structure is applicable as long as it has a function of shifting a phase at every transmission, reception, and every polarization.

Further, each transmission/reception module may have a structure with which only one polarization is received. In this case, as shown in FIG. 10, the antenna surface of the phased array antenna 1 is divided into two in the elevation direction (EL), and also divided into two in the azimuth direction (Az) respectively. Then, an upper half in a left of the antenna surface may be set for the V polarization/+0 degree transmission and the H polarization/+0 degree reception, an upper half in a right may be set for the V polarization/+0 degree transmission, the V polarization/+0 degree reception, a lower half in the left may be set for the H polarization/+0 or +/−90 degree transmission, the H polarization/+0 degree reception, and a lower half in the right may be set for the H polarization/+0 or +/−90 degree transmission and the V polarization/+0 degree reception. In FIG. 10, the relationship of polarizations for transmission, reception and additional phases may be inversed in the right side and left side.

Figure 11:
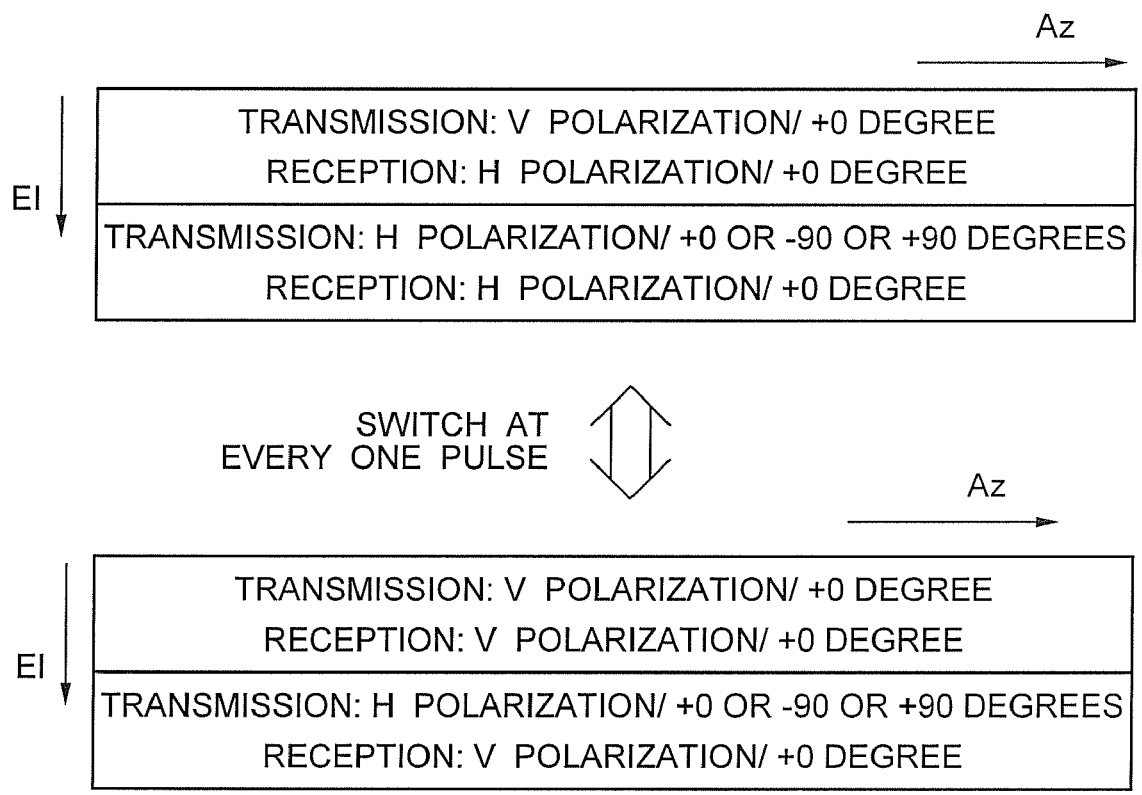
FIG. 11 is a diagram showing setting in which received polarizations are switched alternately according to an exemplary embodiment of the invention.
Figure 12:
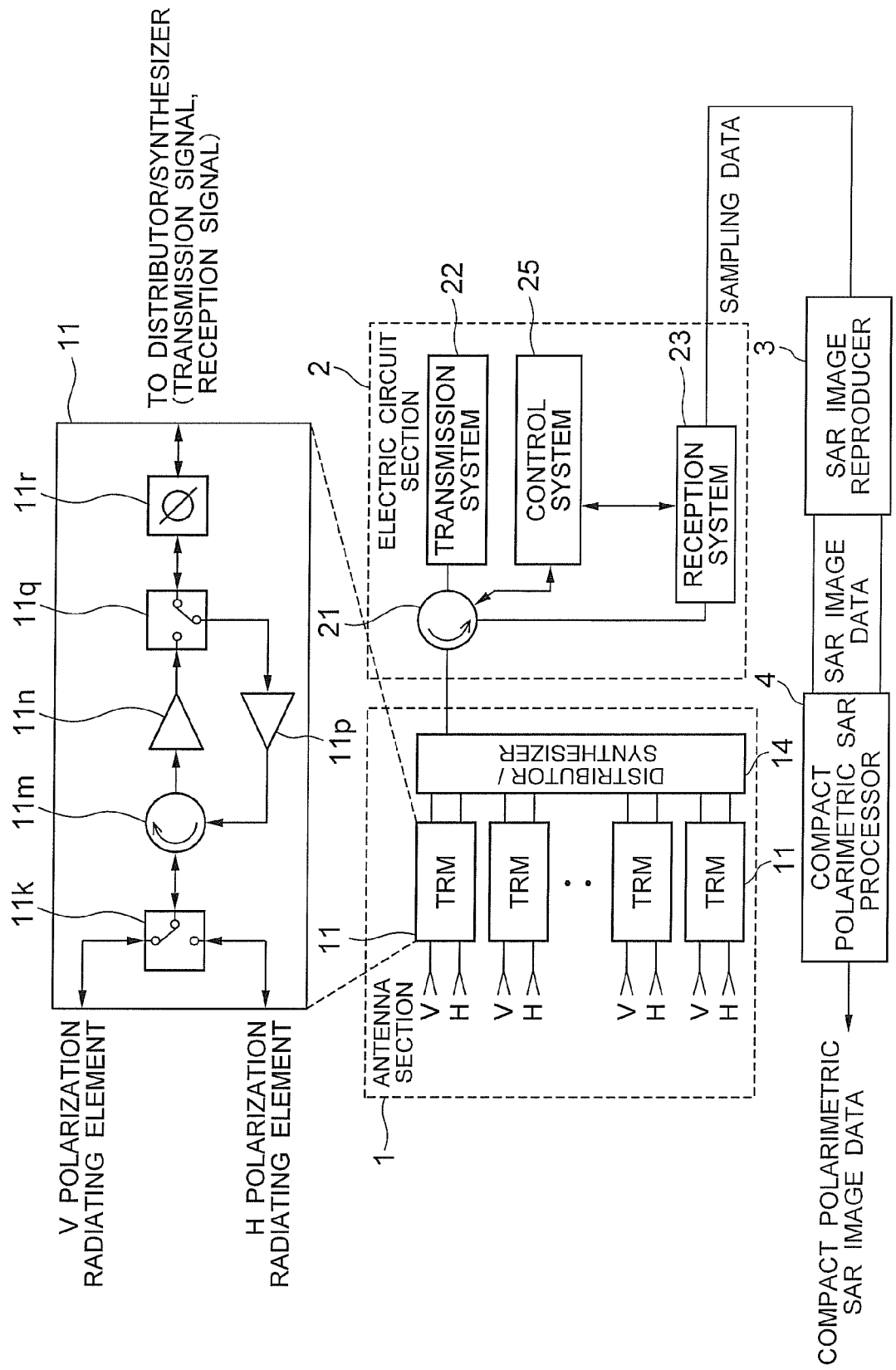
FIG. 12 is a diagram showing an example of single polarization reception according to the exemplary embodiment of the invention.

Further, as shown in FIG. 12, the transmission/reception module 11 includes the phase shifter 11r, the LNA 11n, the HPA 11p, the switches 11k, 11q, and the circulator 11m for using both in transmission and reception. The transmission/reception module 11 shown in FIG. 12 has a structure with which the H polarization and the V polarization are received alternately at every pulse, instead of the structure with which the H polarization and the V polarization are received simultaneously. In this case, as shown in FIG. 11, the upper half of the divided antenna surface is set for the V polarization/+0 degree transmission and the H polarization/+0 degree reception, and the lower half is set for the H polarization/+0, −90 or +90 degrees transmission and the H polarization/+0 degree reception in a case where the H polarization is received. In a case where the V polarization is received, the upper half of the divided antenna surface is set for the V polarization/+0 degree transmission and the V polarization/+0 degree reception, and the lower half is set for the H polarization/+0, −90, or +90 degrees transmission and the V polarization/+0 degree reception. Those settings are changed over at every pulse.

The example shown in FIGS. 11 and 12, the reception polarization is changed over alternately, so that a pulse repetition cycle needs to be short. Therefore, the swath width is limited, but the transmission/reception modules 11 and the electric circuit section 2 are required to have only one reception system. Thus, an overall structure can be effectively simplified and lighten.

Further, in the exemplary embodiment in FIG. 7, the phase is set ideally for controlling the beam directivity, but the phase may be set considering a formed antenna pattern. Furthermore, in FIG. 7, the beam directivity is scanned only in the elevation direction, but the beam directivity may be scanned in two directions of the elevation direction (EL) and the azimuth direction (Az).

Moreover, the example shown in FIGS. 1 and 3, the transmission polarizations and phases are divided in the elevation direction, but those may be divided in the azimuth (Az) direction. Further, in FIG. 2, the SAR image reproducer 3 and the compact polarimetric SAR processor 4 are separated devices, but one computer may include corresponding processing software. Furthermore, the V polarization radiating element and the H polarization radiating element may be connected to the transmission/reception module 11 in FIG. 2 inversely.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

According to the invention, a compact polarimetric SAR can be achieved using a general-purpose phased array antenna for vertical and horizontal polarizations.

What is claimed is:

1. A synthetic aperture radar comprising: an antenna section; an electric circuit section including a control system; an SAR image reproducer; and a compact polarimetric SAR processor; wherein
   the antenna section is a phased array antenna for vertical and horizontal polarizations capable of switching to the horizontal polarization or the vertical polarization in transmission at every transmission/reception module, and for receiving the horizontal polarization and the vertical polarization simultaneously,
   the control system divides electrically an antenna surface of the phased array antenna at a time of transmission to set one of antenna surfaces for horizontal polarization transmission and the other of antenna surfaces for vertical polarization transmission, and, at a time of reception, sets the antenna surface for dual polarization simultaneous reception to receive the horizontal polarization and the vertical polarization in reception, and
   the compact polarimetric SAR processor takes complex data of horizontal polarization receiving data and vertical polarization receiving data, which are transmitted and received by the antenna section and the electric circuit section and imaged respectively by the SAR image reproducer, as a target vector, and obtains a calculation result corresponding to a covariance matrix of a target vector in full polarimetry so as to perform a compact polarimetric SAR processing,
   wherein the control system sets a phase of the transmission/reception module in the phased array antenna to a phase required for control of beam directivity so as to control 45 degrees linear polarization transmission.

2. The synthetic aperture radar, as claimed in claim 1, wherein the control system sets a phase of the transmission/reception module in the phased array antenna in a required setting for control of beam directivity, and shifts a phase difference between the transmission/reception module for the horizontal polarization transmission and the transmission/reception module for the vertical polarization transmission, in addition to the phase setting required for controlling the beam directivity, so as to control circular polarization.

3. The synthetic aperture radar, as claimed in claim 1, wherein the control system divides electrically the antenna surface of the phased array antenna so as to be arranged in an elevation direction.

4. The synthetic aperture radar, as claimed in claim 1, wherein the control system divides electrically the antenna surface of the phased array antenna in an elevation direction and an azimuth direction.

5. The synthetic aperture radar, as claimed in claim 1, wherein the compact polarimetric SAR processor includes a covariance matrix calculation section for performing a compact polarimetric SAR processing in response to a relative phase depending on a position in a range direction of a swath width in the simultaneous reception of the horizontal polarization and the vertical polarization; a look angle and relative phase calculation section; and a convergence calculation section,
   the covariance matrix calculation section takes the complex data of the horizontal polarization receiving data and the vertical polarization receiving data as a target vector, and obtains data of a covariance matrix with respect to the target vector in accordance with a space average of adjacent pixels,
   the look angle and relative phase calculation section obtains a look angle at an observed point in an image based on a geometric relationship, and obtains a relative phase between the horizontal polarization and the vertical polarization in accordance with the obtained look angle, and
   the convergence calculation section outputs a calculation result corresponding to a covariance matrix of a target vector in full polarimetry in accordance with the data of the covariance matrix and data of the relative phase between the horizontal polarization and the vertical polarization.

6. The synthetic aperture radar, as claimed in claim 5, wherein the covariance matrix calculation section takes the complex data of the horizontal polarization receiving data and the vertical polarization receiving data as a target vector, and obtains the data of the covariance matrix by the equation:

$$[\bar{J}]_\phi = \langle \vec{k}_\phi \cdot \vec{k}_\phi^{*} \rangle \quad (4)$$

$$= \begin{bmatrix} J_{\phi 11} & J_{\phi 12} \\ J_{\phi 12}^{*} & J_{\phi 22} \end{bmatrix}$$

$$= \begin{bmatrix} \langle k_{\phi H} \cdot k_{\phi H}^{*} \rangle & \langle k_{\phi H} \cdot k_{\phi V}^{*} \rangle \\ \langle k_{\phi V} \cdot k_{\phi H}^{*} \rangle & \langle k_{\phi V} \cdot k_{\phi V}^{*} \rangle \end{bmatrix},$$

the data of the covariance matrix obtained with respect to the target vector in accordance with a space average of adjacent pixels.

7. The synthetic aperture radar, as claimed in claim 5, wherein, according to a look angle at an observed point in an image based on a geometric relationship, the look angle and relative phase calculation section obtains a relative phase between the horizontal polarization and the vertical polarization in accordance with the equations:

a relative phase $\delta\phi$ in 45 degrees linear polarization transmission, $$\delta\phi=2\pi*N*d/\lambda*(\sin(\beta-\gamma)-\sin(\beta-\alpha)) \quad (2a),$$

a relative phase $\delta\phi$ in left circular polarization transmission, $$\delta\phi=2\pi*N*d/\lambda*(\sin(\beta-\gamma)-\sin(\beta-\alpha))+\pi/2 \quad (2b), \text{ and}$$

a relative phase $\delta\phi$ in right circular polarization transmission, $$\delta\phi=2\pi*N*d/\lambda*(\sin(\beta-\gamma)-\sin(\beta-\alpha))-\pi/2 \quad (2c).$$

8. The synthetic aperture radar, as claimed in claim 5, wherein, based on the data of the covariance matrix and the data of the relative phase between the horizontal polarization and the vertical polarization, and assuming that a variance of cross polarization data is X and setting X=0 as an initial value, the convergence calculation section calculates a value of $|\rho_{H-V}|$ using the equation (5), assigns the value of $|\rho_{H-V}|$ to the equation (6) so as to calculate a value of variance X for the cross polarization data, again assigns the variance X of the cross polarization data to the equation (5), repeating those calculations to converge the value of $|\rho_{H-V}|$ and the variance X of the cross polarization data, assigns the converged variance X of the cross polarization data to equations (7)-(9) to obtain a variance H of horizontal-horizontal polarization data, a variance V of vertical-vertical polarization data, and a covariance P between the horizontal-horizontal polarization data and the vertical-vertical polarization data, and assigns those variances and covariance to an equation (11) so as to obtain a calculation result corresponding to a covariance matrix of a target vector in full polarimetry expressed by an equation (10), wherein:

$$|\rho_{H-V}| = \frac{|J_{\phi 12} - \exp(j\cdot\delta\phi)\cdot X|}{\sqrt{(J_{\phi 11} - X)\cdot(J_{\phi 22} - X)}} \quad (5)$$

$$X = \frac{(1-|\rho_{H-V}|)\cdot(J_{\phi 11} + J_{\phi 22})}{2\cdot(3-|\rho_{H-V}|)} \quad (6)$$

$$X = J_{\phi 22} - X \quad (7)$$

$$H = J_{\phi 11} - X \quad (8)$$

$$P = \exp(j\cdot\delta\phi)\cdot(J_{\phi 12} - \exp(j\cdot\delta\phi)\cdot X) \quad (9)$$

$$\vec{k}_{FP} = {}^t[h, \sqrt{2x}, v] \quad (10)$$

$$[\bar{\bar{J}}]_{FP} = \langle \vec{k}_{FP}\cdot {}^t\vec{k}_{FP}^* \rangle = \begin{bmatrix} H & 0 & P \\ 0 & 2X & 0 \\ P^* & 0 & V \end{bmatrix}. \quad (11)$$

9. A computer readable medium storing a program for causing a computer, which controls a phased array antenna for vertical and horizontal polarizations capable of switching to the horizontal polarization or the vertical polarization in transmission at every transmission/reception module and for receiving two polarizations of the horizontal polarization and the vertical polarization simultaneously, to execute the functions of:

dividing electrically an antenna surface of the phased array antenna so as to be arranged in an elevation direction at a time of transmission to set one of antenna surfaces for horizontal polarization transmission and the other of antenna surfaces for vertical polarization transmission, and, at a time of reception, setting the antenna for dual polarization simultaneous reception to receive the horizontal polarization and the vertical polarization; and, setting a phase of transmission/reception modules in the phased array antenna to be a phase required for controlling the beam directivity so as to control 45 degrees linear polarization transmission, alternatively shifting a phase difference between the transmission/reception module for the horizontal polarization transmission and the transmission/reception module for the vertical polarization transmission, in addition to the phase setting required for controlling the beam directivity, so as to control circular polarization transmission.

10. A computer readable medium storing a program for causing a computer, which performs a compact polarimetric SAR processing depending on a signal received by a phased array antenna for vertical and horizontal polarizations, to execute the function of:

taking complex data of horizontal polarization receiving data and vertical polarization receiving data as a target vector and obtaining covariance matrix data in accordance with a space average of adjacent pixels with respect to the target vector;

obtaining a look angle at an observed point in an image based on a geometric relationship, and obtaining a relative phase between the horizontal polarization and the vertical polarization in accordance with the obtained look angle;

outputting a calculation result corresponding to a covariance matrix of a target vector in full polarimetry in accordance with data of the covariance matrix and data of the relative phase between the horizontal polarization and the vertical polarization; and performing a compact polarimetric SAR processing in response to a relative phase depending on a position in a range direction of a swath width in simultaneous reception of the horizontal polarization and the vertical polarization.

11. The computer readable medium storing the program, as claimed in claim 10, for causing a computer to execute the functions of:

taking complex data of horizontal polarization receiving data and vertical polarization receiving data as a target vector, and obtaining a covariance matrix data with respect to the target vector in accordance with a space average of adjacent pixels via the equation:

$$[\bar{\bar{J}}]_\phi = \langle \vec{k}_\phi \cdot {}^t\vec{k}_\phi^* \rangle \quad (4)$$

$$= \begin{bmatrix} J_{\phi 11} & J_{\phi 12} \\ J_{\phi 12}^* & J_{\phi 22} \end{bmatrix}$$

$$= \begin{bmatrix} \langle k_{\phi H}\cdot k_{\phi H}^* \rangle & \langle k_{\phi H}\cdot k_{\phi V}^* \rangle \\ \langle k_{\phi V}\cdot k_{\phi H}^* \rangle & \langle k_{\phi V}\cdot k_{\phi V}^* \rangle \end{bmatrix}$$

obtaining a look angle at an observed point in an image based on a geometric relationship, and obtaining a relative phase between the horizontal polarization and the vertical polarization in accordance with the equations:

a relative phase $\delta\phi$ in 45 degrees linear polarization transmission, $$\delta\phi=2\pi*N*d/\lambda*(\sin(\beta-\gamma)-\sin(\beta-\alpha)) \quad (2a),$$

a relative phase $\delta\phi$ in left circular polarization transmission, $$\delta\phi=2\pi*N*d/\lambda*(\sin(\beta-\gamma)-\sin(\beta-\alpha))+\pi/2 \quad (2b), \text{ and}$$

a relative phase δφ in right circular polarization transmission, $$\delta\phi = 2\pi \cdot N \cdot d/\lambda \cdot (\sin(\beta-\gamma) - \sin(\beta-\alpha)) - \pi/2 \qquad (2c); \text{ and}$$

based on the data of the covariance matrix and the data of the relative phase between the horizontal polarization and the vertical polarization, and assuming that a variance of cross polarization data is X and setting X=0 as an initial value, the convergence calculation section calculates a value of $|\rho_{H-V}|$ using the equation (5), assigns the value of $|\rho_{H-V}|$ to the equation (6) so as to calculate a value of variance X for the cross polarization data, again assigns the variance X of the cross polarization data to the equation (5), repeating those calculations to converge the value of $|\rho_{H-V}|$ and the variance X of the cross polarization data, assigns the converged variance X of the cross polarization data to equations (7)-(9) to obtain a variance H of horizontal-horizontal polarization data, a variance V of vertical-vertical polarization data, and a covariance P between the horizontal-horizontal polarization data and the vertical-vertical polarization data, and assigns those variances and covariance to an equation (11) so as to obtain a calculation result corresponding to a covariance matrix of a target vector in full polarimetry expressed by an equation (10), wherein:

$$|\rho_{H-V}| = \frac{|J_{\phi 12} - \exp(j \cdot \delta\phi) \cdot X|}{\sqrt{(J_{\phi 11} - X) \cdot (J_{\phi 22} - X)}} \qquad (5)$$

$$X = \frac{(1 - |\rho_{H-V}|) \cdot (J_{\phi 11} + J_{\phi 22})}{2 \cdot (3 - |\rho_{H-V}|)} \qquad (6)$$

$$X = J_{\phi 22} - X \qquad (7)$$

$$H = J_{\phi 11} - X \qquad (8)$$

$$P = \exp(j \cdot \delta\phi) \cdot (J_{\phi 12} - \exp(j \cdot \delta\phi) \cdot X) \qquad (9)$$

$$\vec{k}_{FP} = {}^t[h, \sqrt{2x}, v] \qquad (10)$$

$$[\bar{J}]_{FP} = \langle \vec{k}_{FP} \cdot {}^t\vec{k}_{FP}^* \rangle = \begin{bmatrix} H & 0 & P \\ 0 & 2X & 0 \\ P^* & 0 & V \end{bmatrix}. \qquad (11)$$

12. A compact polarimetric SAR processing method using a phased array antenna for vertical and horizontal polarizations capable of switching to a horizontal polarization or a vertical polarization in transmission at every transmission/reception module, and of receiving two polarizations of the horizontal polarization and the vertical polarization simultaneously for performing a compact polarimetric SAR processing in response to a relative phase depending on a position in a range direction of swath width in simultaneous reception for the horizontal polarization and the vertical polarization, the method comprising:

dividing electrically the an antenna surface of the phased array antenna so as to be arranged in an elevation direction at a time of transmission to set one of antenna surfaces for horizontal polarization transmission and the other of antenna surfaces for vertical polarization transmission, and, at a time of receiving, setting the antenna for dual polarization simultaneous reception to receive the horizontal polarization and the vertical polarization;

taking complex data of horizontal polarization received data and vertical polarization received data as a target vector, and obtains a calculation result corresponding to a covariance matrix of a target vector in full polarimetry so as to perform a compact polarimetric SAR processing;

setting a phase of transmission/reception modules in the phased array antenna to be a phase required for controlling the beam directivity so as to control linear polarization transmission; and shifting a phase difference between the transmission/reception module for the horizontal polarization transmission and the transmission/reception module for the vertical polarization transmission, in addition to the phase setting required for controlling the beam directivity, so as to control circular polarization transmission.

13. The compact polarimetric SAR processing method, as claimed in claim 12, the method further comprising:

taking complex data of horizontal polarization receiving data and vertical polarization receiving data as a target vector, and obtaining data of covariance matrix in accordance with a space average of adjacent pixels with respect to the target vector;

obtaining a look angle at an observed point in an image based on a geometric relationship, and obtaining a relative phase between the horizontal polarization and the vertical polarization in accordance with the obtained look angle;

outputting a calculation result corresponding to a covariance matrix of a target vector in full polarimetry in accordance with the data of the covariance matrix and data of the relative phase between the horizontal polarization and the vertical polarization; and performing a compact polarimetric SAR processing in response to a relative phase depending on a position in a range direction of a swath width in simultaneous reception for the horizontal polarization and the vertical polarization.

14. The compact polarimetric SAR method, as claimed in claim 12, the method further comprising:

taking complex data of horizontal polarization received data and vertical polarization received data as a target vector, and obtaining data of covariance matrix in accordance with a space average in adjacent pixel with respect to the target vector, via the equation:

$$[\bar{J}]_\phi = \langle \vec{k}_\phi \cdot {}^t\vec{k}_\phi^* \rangle \qquad (4)$$

$$= \begin{bmatrix} J_{\phi 11} & J_{\phi 12} \\ J_{\phi 12}^* & J_{\phi 22} \end{bmatrix}$$

$$= \begin{bmatrix} \langle k_{\phi H} \cdot k_{\phi H}^* \rangle & \langle k_{\phi H} \cdot k_{\phi V}^* \rangle \\ \langle k_{\phi V} \cdot k_{\phi H}^* \rangle & \langle k_{\phi V} \cdot k_{\phi V}^* \rangle \end{bmatrix}$$

obtaining a look angle at an observed point in an image based on a geometric relationship, and obtaining a relative phase between the horizontal polarization and the vertical polarization in accordance with the equations:

a relative phase δ in 45 degrees linear polarization transmission, $$\delta\phi = 2\pi \cdot N \cdot d/\lambda \cdot (\sin(\beta-\gamma) - \sin(\beta-\alpha)) \qquad (2a),$$

a relative phase δφ in left circular polarization transmission, $$\delta\phi = 2\pi \cdot N \cdot d/\lambda \cdot (\sin(\beta-\gamma) - \sin(\beta-\alpha)) + \pi/2 \qquad (2b), \text{ and}$$

a relative phase δφ in right circular polarization transmission, $$\delta\phi=2\pi*N*d/\lambda*(\sin(\beta-\gamma)-\sin(\beta-\alpha))-\pi/2 \quad (2c);\text{ and}$$

based on the data of the covariance matrix and the data of the relative phase between the horizontal polarization and the vertical polarization, and assuming that a variance of cross polarization data is X and setting X=0 as an initial value, the convergence calculation section calculates a value of $|\rho_{H-V}|$ using the equation (5), assigns the value of $|\rho_{H-V}|$ to the equation (6) so as to calculate a value of variance X for the cross polarization data, again assigns the variance X of the cross polarization data to the equation (5), repeating those calculations to converge the value of $|\rho_{H-V}|$ and the variance X of the cross polarization data, assigns the converged variance X of the cross polarization data to equations (7)-(9) to obtain a variance H of horizontal-horizontal polarization data, a variance V of vertical-vertical polarization data, and a covariance P between the horizontal-horizontal polarization data and the vertical-vertical polarization data, and assigns those variances and covariance to an equation (11) so as to obtain a calculation result corresponding to a covariance matrix of a target vector in full polarimetry expressed by an equation (10), wherein:

$$|\rho_{H-V}| = \frac{|J_{\phi 12} - \exp(j \cdot \delta\phi) \cdot X|}{\sqrt{(J_{\phi 11} - X) \cdot (J_{\phi 22} - X)}} \quad (5)$$

$$X = \frac{(1-|\rho_{H-V}|) \cdot (J_{\phi 11} + J_{\phi 22})}{2 \cdot (3-|\rho_{H-V}|)} \quad (6)$$

$$X = J_{\phi 22} - X \quad (7)$$

$$H = J_{\phi 11} - X \quad (8)$$

$$P = \exp(j \cdot \delta\phi) \cdot (J_{\phi 12} - \exp(j \cdot \delta\phi) \cdot X) \quad (9)$$

$$\vec{k}_{FP} = {}^t[h, \sqrt{2x}, v] \quad (10)$$

$$[\bar{J}]_{FP} = \langle \vec{k}_{FP} \cdot {}^t\vec{k}_{FP}^* \rangle = \begin{bmatrix} H & 0 & P \\ 0 & 2X & 0 \\ P^* & 0 & V \end{bmatrix}. \quad (11)$$

* * * * *